(12) United States Patent
Greene et al.

(10) Patent No.: US 12,368,783 B1
(45) Date of Patent: Jul. 22, 2025

(54) SYSTEMS AND METHODS FOR PREVENTING SYNTHETIC MISAPPROPRIATION EVENTS OVER AN ELECTRONIC NETWORK

(71) Applicant: BANK OF AMERICA CORPORATION, Charlotte, NC (US)

(72) Inventors: Steven Nathan Greene, Scarsdale, NY (US); Aravind Shankaragouda Singtalur, McKinney, TX (US); Srinath S. Chakravarty, Plano, TX (US); Dinesh Kumar Agrawal, Rowlett, TX (US); Stephen Richard Belton, Garden City, NY (US); Petar Evan Puskarich, Murphy, TX (US); Manmohan V. Datla, Frisco, TX (US); Kenneth L. Boyd, Mechanicsville, VA (US); Kerry M. Vaughan, Lawrenceville, NJ (US); Elina Shkodnik, Staten Island, NY (US); Tonya Kyra Miller, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 19 days.

(21) Appl. No.: 18/408,200

(22) Filed: Jan. 9, 2024

(51) Int. Cl.
*H04L 67/306* (2022.01)
*G06T 13/40* (2011.01)

(52) U.S. Cl.
CPC ............ *H04L 67/306* (2013.01); *G06T 13/40* (2013.01)

(58) Field of Classification Search
CPC .............................. H04L 67/306; G06T 13/40
(Continued)

(56) References Cited

U.S. PATENT DOCUMENTS 9,106,789 B1   8/2015   Shipman, Jr.
9,225,701 B2  12/2015   Gongaware
(Continued)

FOREIGN PATENT DOCUMENTS

CA          2774622 C      6/2016
WO     2013097264 A1      7/2013

*Primary Examiner* — Wing F Chan
*Assistant Examiner* — Leon Y Tseng
(74) *Attorney, Agent, or Firm* — Moore & Van Allen PLLC; Lauren M. Stokes

(57) ABSTRACT

Systems, computer program products, and methods are described herein for preventing synthetic misappropriation events over an electronic network. The present disclosure is configured to identify a user communication associated with a communication channel; identify a user account associated with the user communication; collect user account data associated with the user account; receive at least one user communication data via the communication channel; transmit the at least one user communication data to at least one internal communication component; receive at least one internal communication data from the internal communication component; generate a virtual avatar based on at least one of user account data, the at least one user communication data, or the at least one internal communication data; and transmit a virtual avatar interface component based on the virtual avatar to a user device associated with the communication channel, wherein the virtual avatar comprises the at least one internal communication data.

20 Claims, 8 Drawing Sheets

(58) Field of Classification Search
USPC .......................................................... 709/217
See application file for complete search history.

(56) References Cited

U.S. PATENT DOCUMENTS

| | | | |
|---|---|---|---|
| 9,547,760 | B2 | 1/2017 | Kang |
| 9,652,663 | B2 | 5/2017 | Lau |
| 10,049,287 | B2 | 8/2018 | Holz |
| 10,275,121 | B1 | 4/2019 | Geiger |
| 10,509,951 | B1 | 12/2019 | Nagalla |
| 10,515,199 | B2 | 12/2019 | Samadani |
| 10,762,368 | B2 | 9/2020 | Lin |
| 10,769,635 | B2 | 9/2020 | Lindemann |
| 10,931,676 | B2 | 2/2021 | Pantazelos |
| 11,138,302 | B2 | 10/2021 | Figueredo De Santana |
| 11,256,792 | B2 | 2/2022 | Tussy |
| 11,595,617 | B2 | 2/2023 | Tong |
| 11,929,997 | B2 | 3/2024 | Briceno |
| 2020/0219302 | A1 | 7/2020 | Tarquini |
| 2022/0164643 | A1* | 5/2022 | Charnock ............. G06F 16/951 |
| 2022/0222993 | A1 | 7/2022 | Kawase |
| 2023/0031087 | A1 | 2/2023 | Tussy |
| 2023/0267680 | A1* | 8/2023 | Lamour .................. G10L 13/02 |
| | | | 345/419 |
| 2024/0161120 | A1* | 5/2024 | Breitweiser ............ G06Q 40/08 |
| 2024/0233232 | A9* | 7/2024 | Peshkov .............. G06V 40/175 |
| 2024/0249286 | A1* | 7/2024 | Greene .............. G06Q 20/3276 |

* cited by examiner

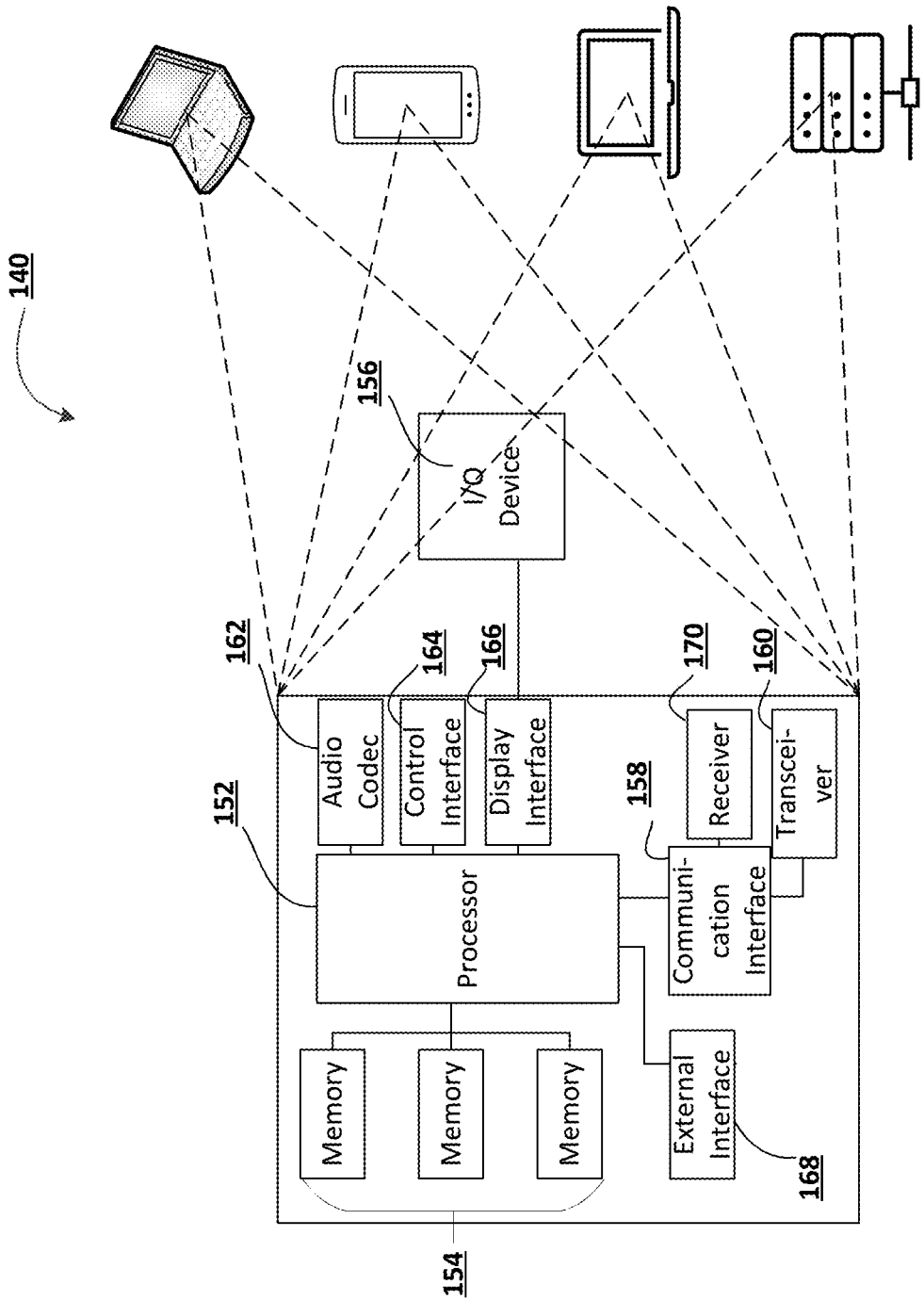

SYSTEMS AND METHODS FOR PREVENTING SYNTHETIC MISAPPROPRIATION EVENTS OVER AN ELECTRONIC NETWORK

TECHNOLOGICAL FIELD

Example embodiments of the present disclosure relate to systems and methods for preventing synthetic misappropriation events over an electronic network.

BACKGROUND

Misappropriation events, such as attempted misappropriation of user accounts, resource accounts, data, applications, and/or the like, can be difficult to determine. Such issues are further exacerbated when the misappropriation attempts and events occur over an electronic network (such as when a user is remote or otherwise not visible directly to an agent over the electronic network), and can only be detected by analyzing the data from a communication channel, in real time. Additionally, and where multiple communication channels with different user communications are occurring at the same time, robust data (including current and historical data) may need to be collected, analyzed, and/or compared efficiently, automatically, and dynamically in order to determine whether a misappropriation event is actually occurring. Thus, a need exists for a system and method that prevents synthetic misappropriation events over an electronic network.

Applicant has identified a number of deficiencies and problems associated with detecting and preventing misappropriation events during electronic communications. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for preventing synthetic misappropriation events over an electronic network.

In one aspect, a system for preventing synthetic misappropriation events over an electronic network is provided. In some embodiments, the system may comprise: a memory device with computer-readable program code stored thereon; at least one processing device, wherein executing the computer-readable code is configured to cause the at least one processing device to perform the following operations: identify (or help identify) a user communication associated with a communication channel; identify (or help identify) a user account associated with the user communication; collect (or help collect) user account data associated with the user account; receive at least one user communication data via the communication channel; transmit the at least one user communication data to at least one internal communication component; receive at least one internal communication data from the internal communication component; generate a virtual avatar based on at least one of user account data, the at least one user communication data, or the at least one internal communication data; and transmit (or control) a virtual avatar interface component based on the virtual avatar to a user device associated with the communication channel, wherein the virtual avatar comprises the at least one internal communication data.

In some embodiments, the user account data comprises at least one of historical user communication data, historical user account data, current user communication data, current user account data, historical user account type data, or current user account type data. In some embodiments, the historical user account data and the current user account data comprise at least one same data type.

In some embodiments, the communication channel comprises at least one of an audio communication channel, an audio-visual communication channel, or a messaging communication channel.

In some embodiments, the at least one internal communication data comprises text data, and wherein executing the computer-readable code is configured to cause the at least one processing device to perform the following operations: generate a computer-generated vocal indication based on the text data; and apply the computer-generated vocal indication to the virtual avatar interface component.

In some embodiments, executing the computer-readable code is configured to cause the at least one processing device to perform the following operations: identify at least one transfer request associated with an internal communication channel; identify at least one secondary internal communication component based on the at least one transfer request; and transmit the at least one user communication data and the communication channel to the at least one secondary internal communication component. In some embodiments, the secondary internal communication component is identified based the user communication data.

In some embodiments, executing the computer-readable code is configured to cause the at least one processing device to perform the following operations: compare historical user account data to current user account data from the communication channel; and generate, based on the comparison of the historical user account to the current user account data, a threat score associated with a user of the communication channel. In some embodiments, the historical user account data comprises at least one of a historical image of a user, a historical sound of a user associated, a geographic location, a historical internet protocol address, a historical communication channel device, or a historical background data. In some embodiments, the threat score is compared to a threat threshold score, and wherein a threat attribute is generated based on the comparison of the threat score to the threat threshold score.

Similarly, and as a person of skill in the art will understand, each of the features, functions, and advantages provided herein with respect to the system disclosed hereinabove may additionally be provided with respect to a computer-implemented method and computer program product. Such embodiments are provided for exemplary purposes below and are not intended to be limited.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompany- ing drawings. The components illustrated in the figures may or may not be present in certain embodiments described herein. Some embodiments may include fewer (or more) components than those shown in the figures.

Figure 1A:
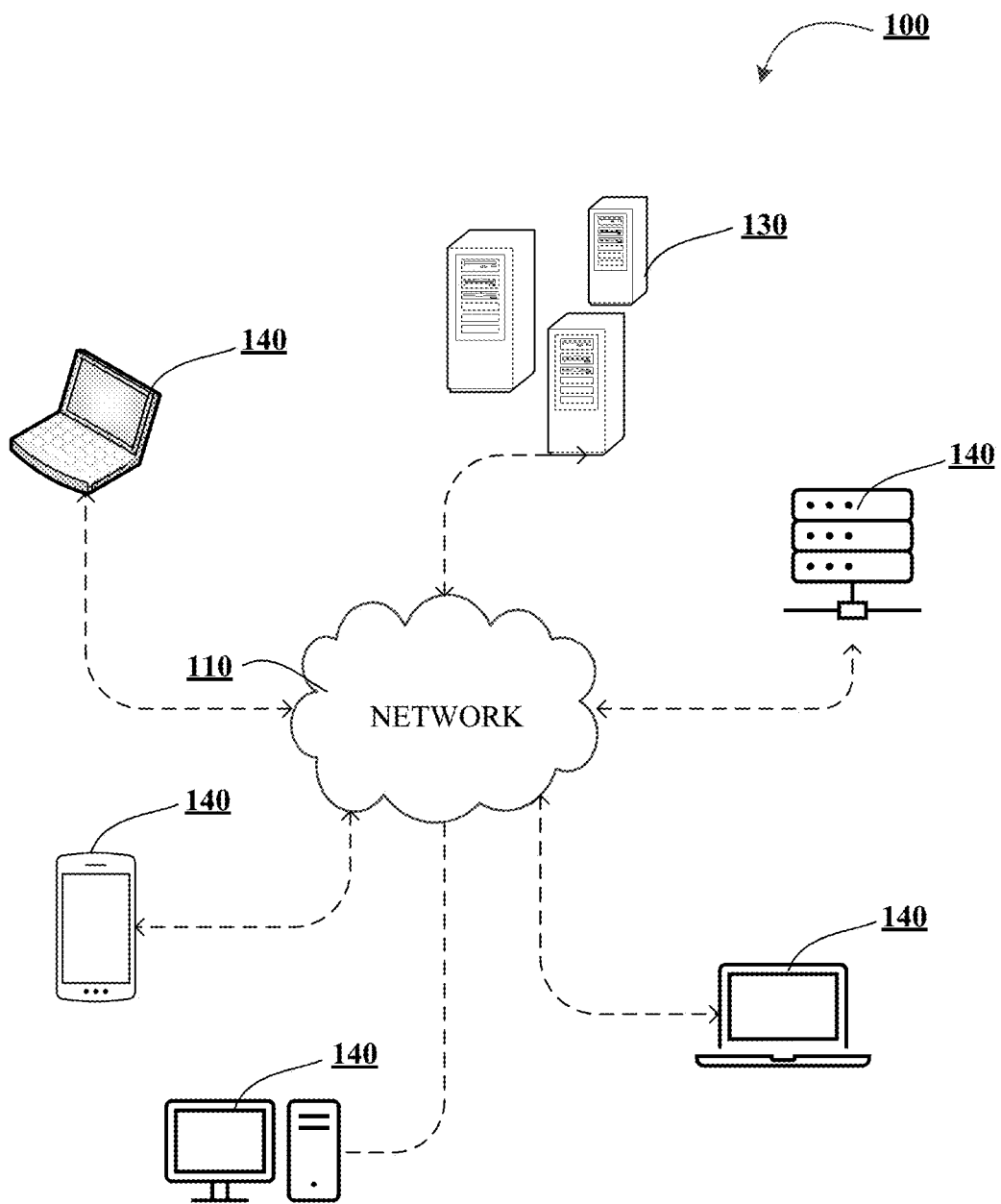
Figure 1B:
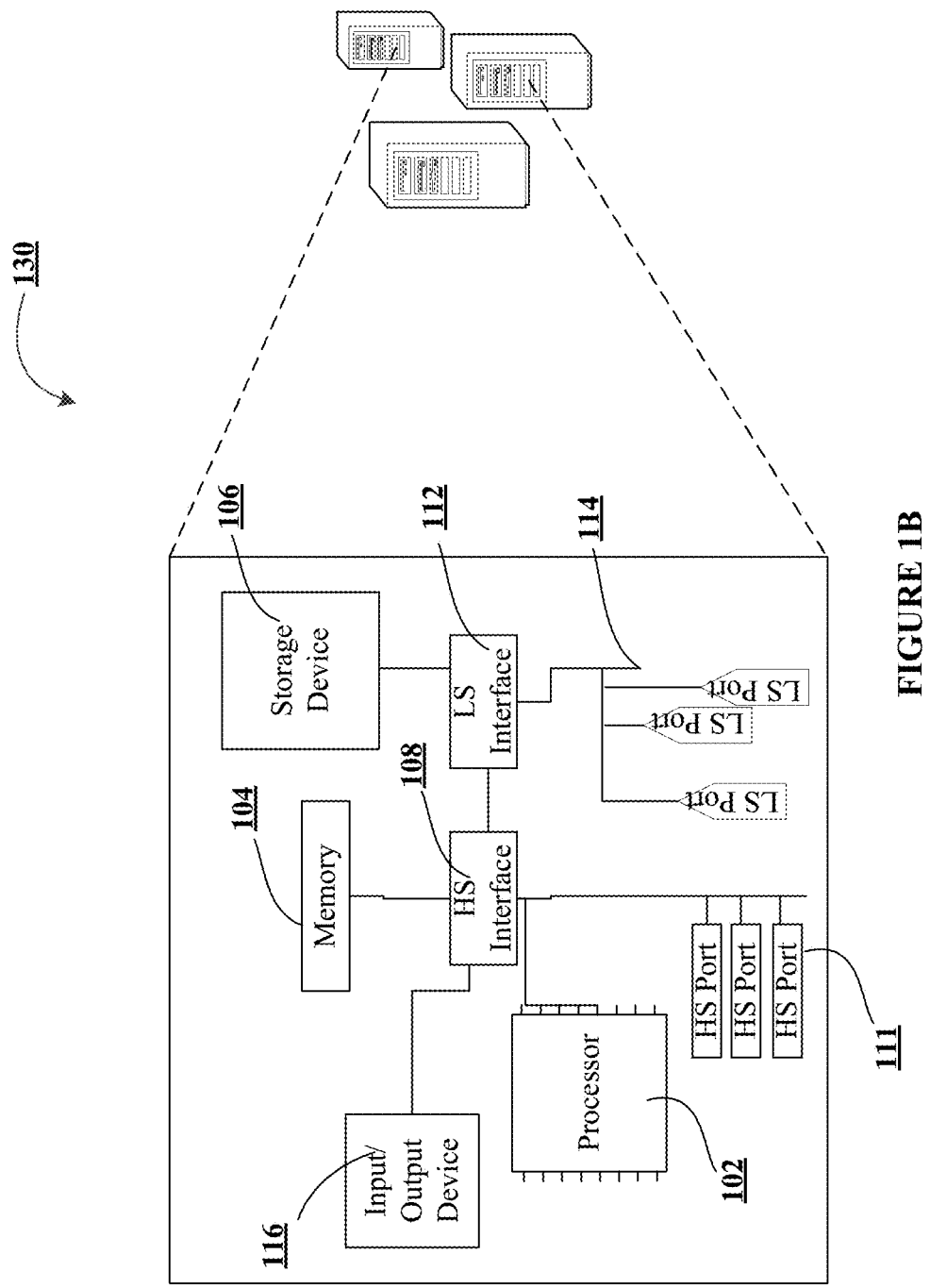
Figure 2:
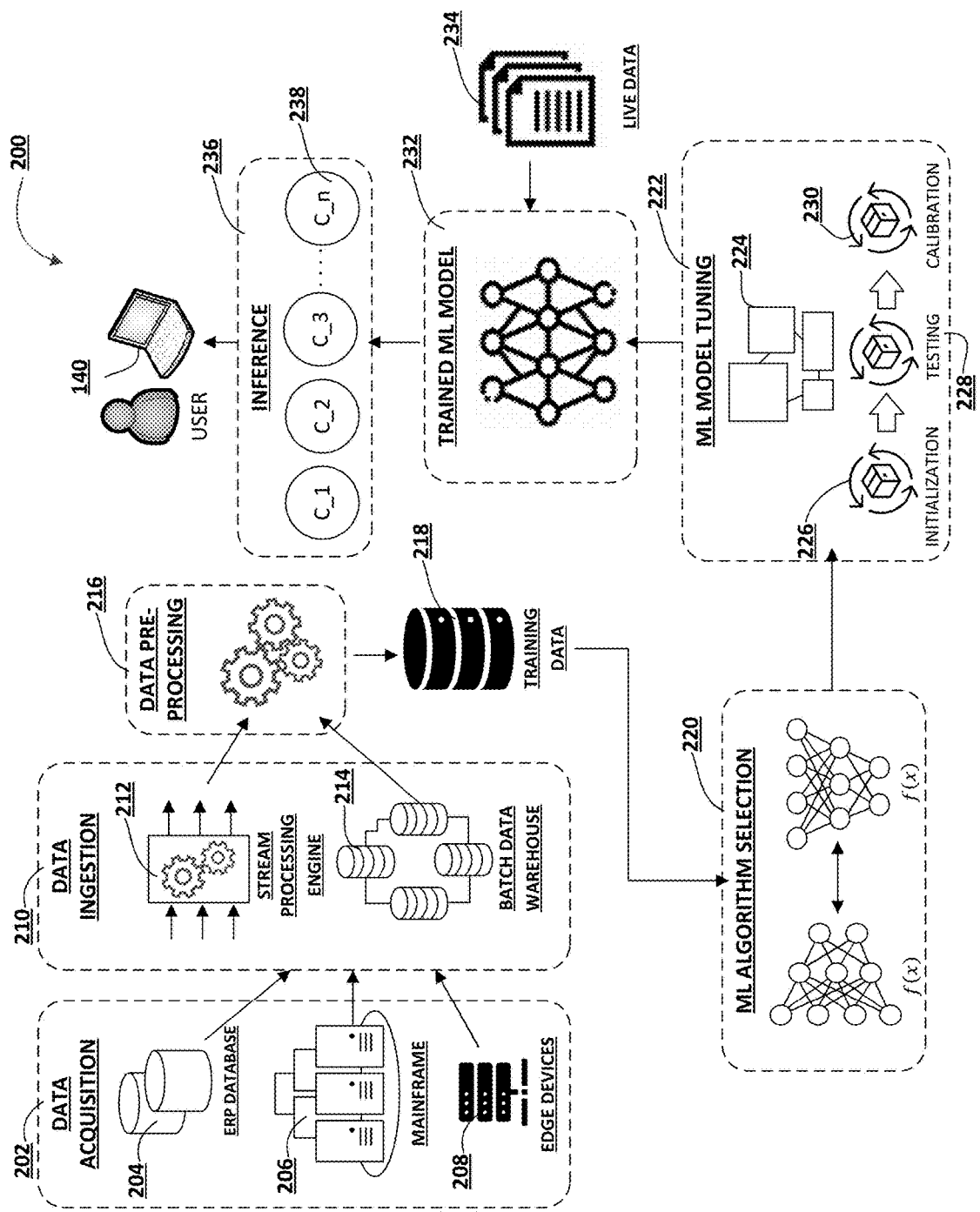
Figure 3:
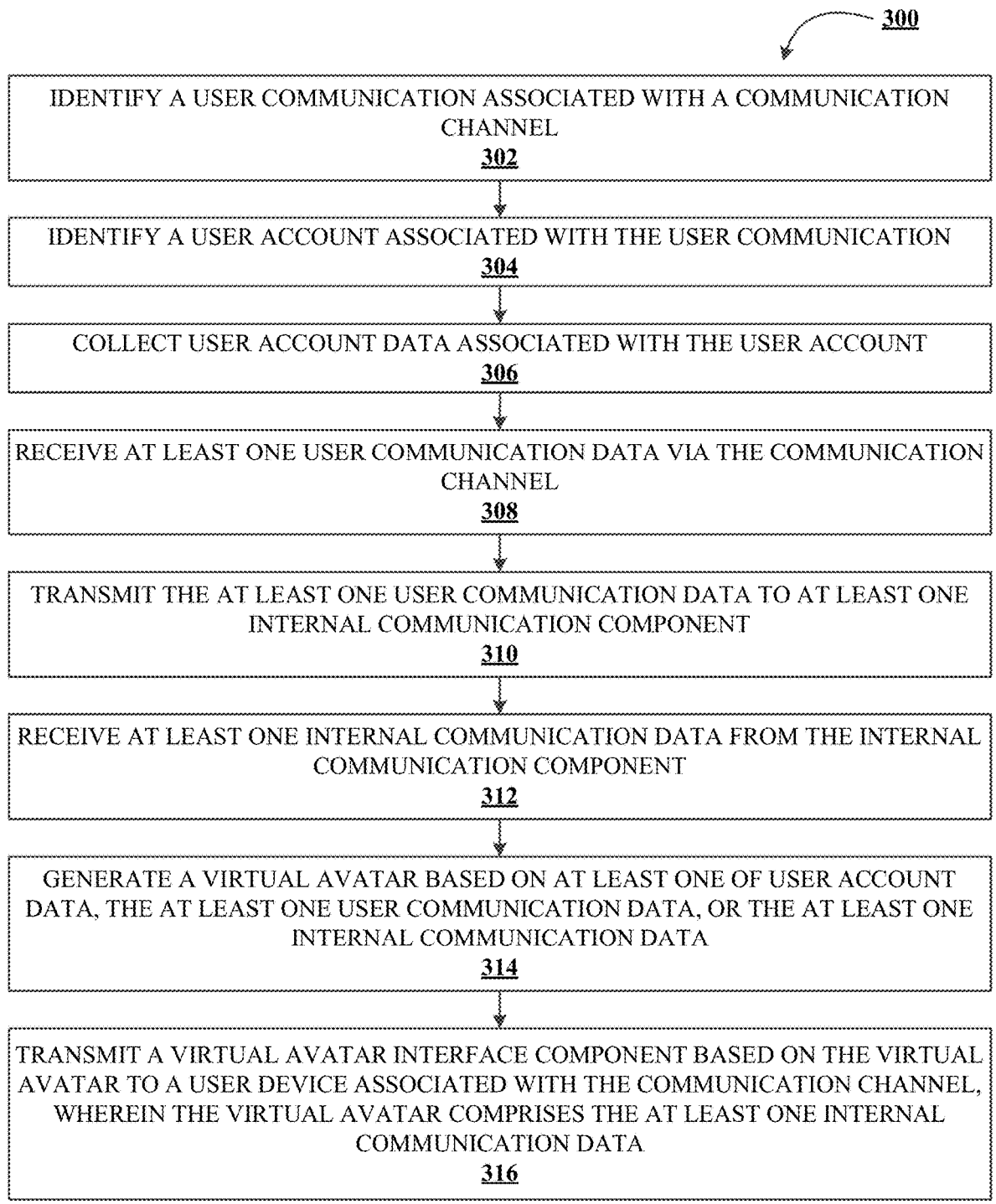
Figure 4:
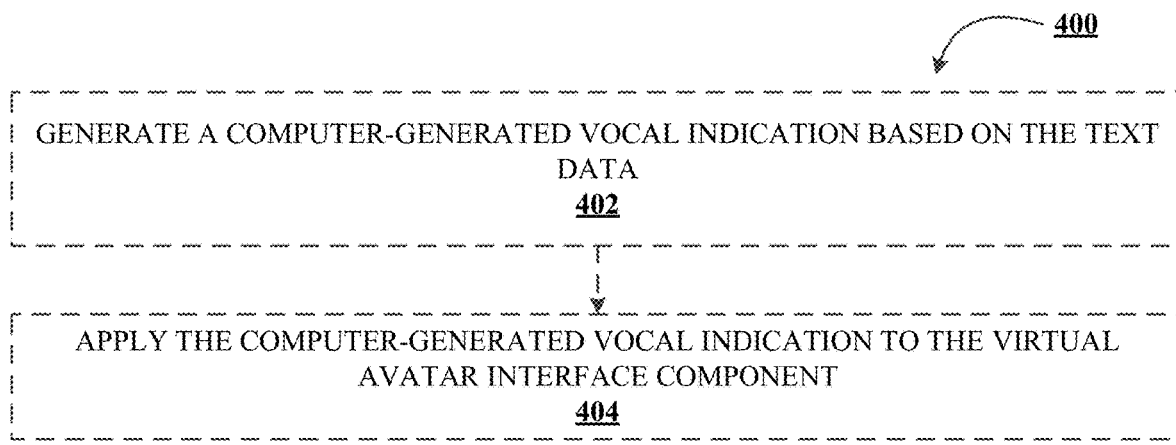
Figure 5:
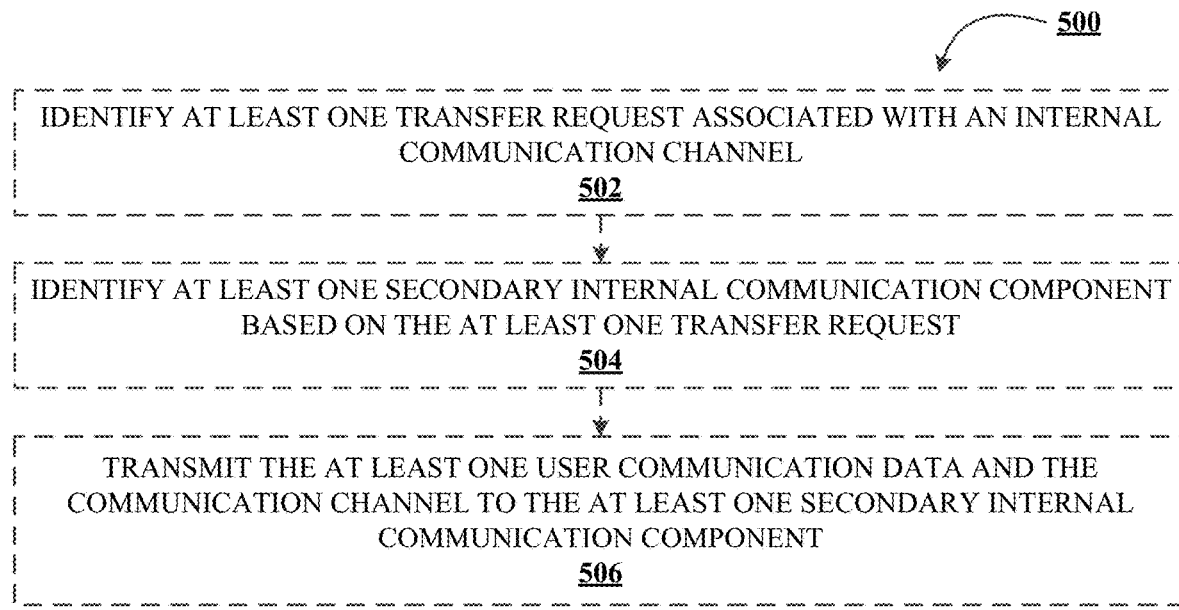
Figure 6:
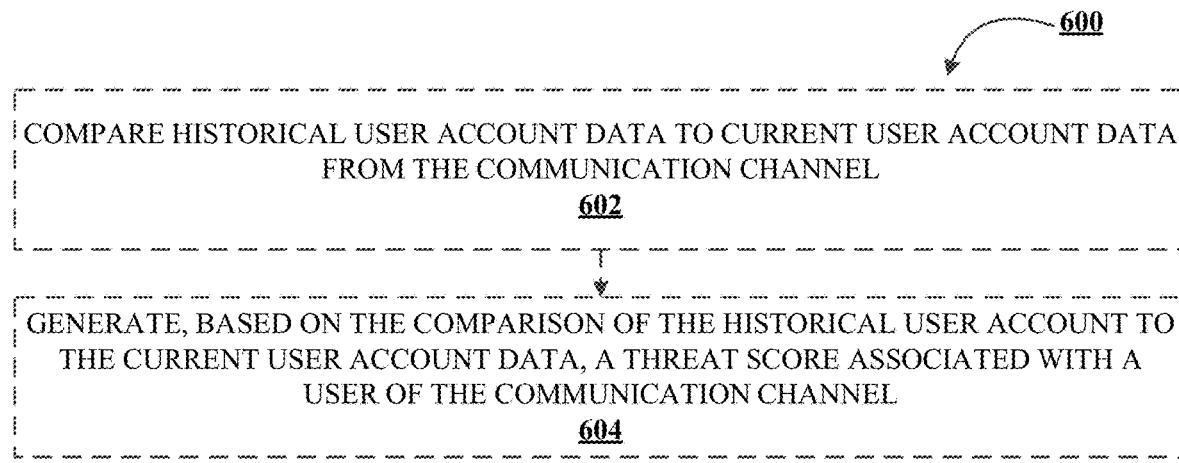

FIGS. 1A-1C illustrates technical components of an exemplary distributed computing environment for preventing synthetic misappropriation events over an electronic network, in accordance with an embodiment of the disclosure;

FIG. 2 illustrates an exemplary machine learning (ML) subsystem architecture 200, in accordance with an embodiment of the disclosure;

FIG. 3 illustrates a process flow for preventing synthetic misappropriation events over an electronic network, in accordance with an embodiment of the disclosure;

FIG. 4 illustrates a process flow for applying a computer-generating vocal indication to the virtual avatar interface component, in accordance with an embodiment of the disclosure;

FIG. 5 illustrates a process flow for transmitting the user communication data and the communication channel to a secondary internal communication component(s), in accordance with an embodiment of the disclosure; and FIG. 6 illustrates a process flow for generating a threat score associated with a user of the communication channel, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository—a storage location where one or more resources are organized, stored and retrieved electronically using a computing device.

Misappropriation events, such as attempted misappropriation of user accounts, resource accounts, data, applications, and/or the like, can be difficult to determine. Such issues are further exacerbated when the misappropriation attempts and events occur over an electronic network, and can only be detected by analyzing the data from a communication channel, in real time. Additionally, and where multiple communication channels with different user communications are occurring at the same time, robust data (including current and historical data) may need to be collected, analyzed, and/or compared efficiently, automatically, and dynamically in order to determine whether a misappropriation event is actually occurring. Thus, a need exists for a system and method that prevents synthetic misappropriation events over an electronic network. Additionally, problems and issues arise where confusion of may occur on the part of the user as the user is transferred between agents of an entity. Thus, a need also exists for a system and method that can seamlessly transfer between communication channels and communication channel components (e.g., user devices and users within an entity) without making a user (e.g., a client of the entity) aware of the transfer.

Thus, the disclosure provided herein provides a system, method, and/or the like, that generates a two-way communication (e.g., a bi-directional video call) between a user and an entity, whereby the two-way communication comprises a user-selected avatar for the entity communication (e.g., the entity's agent(s) are shown as the user-selected avatar). Further, the system may comprise facial recognition software which compares the current image/video of the user (and associated background metadata) to the user account's photos, metadata, and/or the like, to confirm the user in the current video is actually the user associated with the user account. Additionally, the system may provide that the two-way communication comprises a bi-directional video call between the user and the user-selected avatar, where the user-selected avatar is controlled by at least one user of the entity (e.g., an agent of the entity). The system may collect and store data from the current communication with the user and/or may collect and store data from historical communications with the user, and may dynamically and automatically select which user from the entity to control the user-selected avatar (e.g., such as selecting a specialist within the entity that specializes in a field associated with the current communication data and/or the historical communication data). Lastly, and in some embodiments, the system may comprise a text-to-speech component which is configured to generate speech from the entity's communication, where text is entered on the entity communication's side and speech is generated as speech from the avatar to the user.

Accordingly, the present disclosure provides identifying a user communication associated with a communication channel; identifying a user account associated with the user communication; collecting user account data associated with the user account; receiving at least one user communication data via the communication channel; and transmitting the at least one user communication data to at least one internal communication component. Additionally, the present disclosure further provides receiving at least one internal communication data from the internal communication component; generating a virtual avatar based on at least one of user account data, the at least one user communication data, or the at least one internal communication data; and transmitting a virtual avatar interface component based on the virtual avatar to a user device associated with the communication channel, wherein the virtual avatar comprises the at least one internal communication data.

What is more, the present disclosure provides a technical solution to a technical problem. As described herein, the technical problem includes the determination of misappropriation event over electronic networks and the seamless transfer of communication channels as viewed from an outside communication channel perspective. The technical solution presented herein allows for such a seamless transfer and integration between communication channels (e.g., internal communication channel/internal communication channel components) and the automatic, efficient, and dynamic determination of misappropriation events during the communications over the communication channels. In particular, the disclosure provided herein is an improvement over existing solutions to the determination of misappropriation events over electronic networks and the seamless transfer of communications, (i) with fewer steps to achieve the solution, thus reducing the amount of computing resources, such as processing resources, storage resources, network resources, and/or the like, that are being used (e.g., authentication credentials may not need to be taken separately between every transfer within the internal communication channel), (ii) providing a more accurate solution to problem, thus reducing the number of resources required to remedy any errors made due to a less accurate solution (e.g., by comparison historical and current user data to determine a threat score), (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources (e.g., by determining the correct transfer request for any issues or problems that may arise during the user communication, such that the user communication is not transferred more than necessary, and by implementing a virtual avatar such that computing resources such as cameras, microphones, and/or the like are not used within the internal communication channel). Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for preventing synthetic misappropriation events over an electronic network 100, in accordance with an embodiment of the invention. As shown in FIG. 1A, the distributed computing environment 100 contemplated herein may include a system 130 (i.e., a system for preventing synthetic misappropriation events over an electronic network), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other. The functionality provided by 130 may also be distributed or centralized. It might be provided by shared, virtualized, containerized or other segmenting technologies or be the sole purpose of a device.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio hardware or software codec 162, which may receive spoken information from a user and convert it to usable digital information. Hardware or software audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the disclosure. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1, C\_2 \ldots C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1, C\_2 \ldots C\_n$ 238) live data 234 based on how similar they are to one another to solve exploratory challenges where little is known about the data, provide a description or label (e.g., $C1, C\_2 \ldots C\_n$ 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow 300 for preventing synthetic misappropriation events over an electronic network, in accordance with an embodiment of the disclosure. In some embodiments, a system (e.g., similar to one or more of the systems described herein with respect to FIGS. 1A-1C) may perform one or more of the steps of process flow 300. For example, a system (e.g., the system 130 described herein with respect to FIG. 1A-1C) may perform the steps of process 300.

As shown in block 302, the process flow 300 may include the step of identifying a user communication associated with a communication channel. For example, a user communication may comprise an audio communication (e.g., such as via a telephone, cellphone, a microphone, voice over Internet Protocol (VoIP), and/or the like) comprising audio data generated by the user; an audio-visual communication (e.g., such as a video recording via a camera) comprising audio and video data generated by the user and/or by a user device recording the user; a message communication and/or text data communication (e.g., such as by email, instant messaging, text messages, short messages/messaging service (SMS), facsimile, and/or the like), and/or the like. In some embodiments, such data generated by the user and/or by the user device as the user interacts with the user device may comprise data within a communication channel, which is configured to transmit the communication data of the user communication across a network.

Further, and as used herein the communication channel is configured to transmit the user communication data from the user device of the user across a network (such as network 110 of FIG. 1A) to a secondary user device and/or an entity user device associated with an entity, whereby the entity user device may be one of many supported by a singular entity or a plurality of entities (e.g., such as a singular financial institution, a single business, a single merchant, a single service provider, a plurality of financial institutions, a plurality of business, a plurality of merchants, a plurality of service providers, and/or the like). Thus, and in some embodiments, the entity user device(s) supported by an entity may be associated with a particular user or agent of the entity, such that the user and/or agent may interact with the user of the user device via the network.

In some embodiments, the communication channel may comprise at least one of an audio communication channel (e.g., over telephone, cellphone, VoIP, computer-generated calls, and/or the like), an audio-visual communication channel (e.g., via a camera that is connected or housed within a computing device, a generic video call, a video call enabled webpage, a video conference channel, and/or the like), a messaging communication channel (e.g., over text message, instant messaging, email, SMS, facsimile, an/or the like), or a vendor-provided communication application or channel, and/or the like). As used herein, such a communication channel refers to a medium (e.g., physical such as a wired connected, wireless connection, and/or the like), which is used to communicate data from at least one origination device to at least one secondary device.

As shown in block 304, the process flow 300 may include the step identifying a user account associated with the user communication. For example, a user account may be identified based on the user communication collected, identified, and/or received, whereby the user communication data may be parsed as it is collected, identified, and/or received and data identifying who the user is of the user communication may be used to determine a user account identifier. For instance, and in some embodiments, the system may identify a phone number used for the communication channel, an IP address used for the communication channel, a wireless fidelity (Wi-Fi) identifier used for the communication channel, a geolocation used for the user device of the communication channel, and/or the like, and match such data (e.g., phone number, IP address, Wi-Fi identifier, geolocation, and/or the like) to known data of a user account (e.g., a known phone number of a user account, a known IP address previously used by a user account, a Wi-Fi identifier used by a user account, a geolocation previously associated with a user account, and/or the like) to associated the user communication with a particular user account. In some embodiments, such data may be used as secondary data in identifying the user account, whereby primary data such as a user account identifier (e.g., username, account number, authentication credential, name, and other such personally identifiable information) may be collected from the user communication data and used to identify the correct user account. Such personally identifier information may be requested over the communication channel from an agent of an entity and the request may be transmitted to the user device over a network, and the response may be collected from the user device and transmitted back through the network.

As shown in block 306, the process flow 300 may include the step of collecting user account data associated with the user account. For example, the system may collect user account data once a user account has been identified based on the user communication data, whereby such user account data may comprise current user account data (e.g., collected from the current communication channel), historical user account data (e.g., collected from previous communication channel communications and/or from other interactions by the user with the entity and/or with an entity's electronic network, an entity's website, an entity's brick and mortar location, an entity's agent, and/or the like, in previous or historical instances. Thus, and as used herein, the user account data may comprise current data and/or all the historical data recorded for a user by an entity (e.g., the data pertinent to the entity's purpose).

For example, the user account data may comprise at least one of historical user communication data (e.g., the data collected from the previous communications between the user and the entity, electronic, physical, and/or the like), historical user account data (e.g., data collected from a user account that may have been input or filled in by the user themselves, by an agent of the entity, and/or the like), current user communication data (e.g., communication data from a current communication channel communication), current user account data (e.g., data collected from a current application, a current loan application, a current resource advance account, a current resource account, and/or the like, associated with the user account), historical user account type data (e.g., the types of accounts owned and/or operated by the user, such as historical resource accounts, historical resource advance accounts, and/or the like), and/or current user account type data (e.g., the types of accounts owned and/or operated by the user currently, such as current resource accounts and balances, current resource advance accounts and balances, and/or the like).

As shown in block 308, the process flow 300 may include the step of receiving at least one user communication data via the communication channel. For example, the system may receive (e.g., via a network communication such as via the communication channel) at least one user communication data from the communication channel that the user is currently using to communicate with an entity by identifying the data transmitted over a network, collecting the data transmitted over the network (e.g., voice data, text data, audio data, visual data, and/or the like), and parsing the data that was collected. In some embodiments, the user communication data may be received, collected, and parsed for the entire stream of data across the communication channel for the current communication window (e.g., until a user signs off, exits the window, hangs up the phone, and/or the like). In some embodiments, the user communication data may further comprise user account data.

As shown in block 310, the process flow 300 may include the step of transmitting the at least one user communication data to at least one internal communication component. For instance, the system may transmit the at least one user communication data (e.g., the user communication data collected and/or parsed, user account data, and/or the like) to an internal communication component(s), whereby the internal communication component(s) comprises user input devices similar to the end-point device(s) described above with respect to FIG. 1A, whereby such internal communication component(s) may be interacted with by a user (such as an agent of an entity) in order to communicate or interact with a user of a user device of the communication channel. In this manner, the internal communication component may be "internal" to a network of an entity, such as that the internal communication component is linked and/or connected (physically and/or wireless) to the entity's network and/or other devices within the entity's network. Such a linking and/or connection of these internal communication components of an entity's network may allow for the seamless, automatic, and efficient transfer of the user (via the communication channel) between two or more internal communication components. Such a seamless, automatic, and efficient transfer of the communication channel over the entity's network may allow for the transfer of the communication channel between two or more internal communication components without requiring separate authorizations, separate firewall bypassing protocols, separate databases to be stored for each internal communication component (such as databases comprising user account data necessary for the interaction with the user), and/or the like. Additionally, and as used herein, the term "transfer" with respect to the transfer of the communication channel also refers to a transfer comprising an addition of the second (or more) internal communication component(s), whereby the transfer comprises an overlapping of the first or previous communication component and the second or new communication channel component, such that there is no instance in time where the communication channel is not interacting with at least one communication component.

As shown in block 312, the process flow 300 may include the step of receiving at least one internal communication data from the internal communication component. For instance, the system may receive at least one internal communication data from an internal communication component(s), whereby the at least one internal communication data may be received as text data, audio data, audio-visual data, messaging data, and/or the like.

In some embodiments, the system may receive the at least one internal communication data as text data from an internal user (e.g., such as text data in the form of a message, in the form of an instruction, as the form of an explanation, and/or the like). Thus, and in some such embodiments, the system may take such text data as the internal communication data, convert the text data to audio data (e.g., such as by computer-generated audio) and transmit the audio data over the communication channel to the user, such that the user can listen to the information from the text data. In such embodiments, the use of collecting text data from the internal communication component allows for the filtering of any background noise that may be picked up if the user of the internal communication component were to input audio data, audio-visual data, and/or the like in response to a user communication. In this manner, only the data necessary for transmission back to the user of the user device will be received and identified, rather than any noise that could potentially disrupt or misinform the user if transmitted back to the user.

In some embodiments, a machine learning model (e.g., such as the one shown and described with respect to FIG. 2) may be implemented within the system. For instance, and in some embodiments, a machine learning model may be trained with previous user communication data from at least one communication channel types, parse the previous user communication data to decode the natural language requests of the user communication data (e.g., such as through a natural language processor, which may be likewise part of the machine learning model and/or the system itself), and previous instances of generated internal communication data in response to the user communication data. In this manner, the machine learning model (and the natural language processor) may be trained to generate—in real time and/or near real time—the at least one internal communication data.

As shown in block 314, the process flow 300 may include the step of generating a virtual avatar based on at least one of user account data, the at least one user account data, or the at least one internal communication data. For example, the system may generate a virtual avatar that imitates or looks like a human actor, an animal actor, a real-world physical being, and/or the like. In some embodiments, the system may determine what the virtual avatar should look like based on user account data (such as user account settings which have been filled in by the user of the user account for their preferences). In some embodiments, the data used to generate the virtual avatar may be used by the system to generate a virtual avatar interface component which may configure a graphical user interface to show the virtual avatar as it "speaks" using the audio data generated from the text data of block 312.

As shown in block 316, the process flow 300 may include the step of transmitting a virtual avatar interface component based on the virtual avatar to a user device associated with the communication channel, wherein the virtual avatar comprises the at least one internal communication data. For instance, the system may generate a virtual avatar interface component, which comprises a data packet comprising the data of the virtual avatar and the audio data from the text data of block 312, and which is used to configure a graphical user interface of a user device and/or endpoint device to show the virtual avatar in a human-viewable format as it states the information of the audio data. In some embodiments, the virtual avatar interface component may comprise a plurality of audio data that is received over a plurality of periods, such as when the internal communication component is responding to various periods of user communication data when each user communication data is received. In some embodiments, the virtual avatar interface component may be controlled by the system, such as in the instance where the virtual avatar interface component is local to the system as it is shown on the user device.

FIG. 4 illustrates a process flow 400 for applying a computer-generating vocal indication to the virtual avatar interface component, in accordance with an embodiment of the disclosure. In some embodiments, a system (e.g., similar to one or more of the systems described herein with respect to FIGS. 1A-1C) may perform one or more of the steps of process flow 400. For example, a system (e.g., the system 130 described herein with respect to FIG. 1A-1C) may perform the steps of process 400.

In some embodiments, and as shown in block 402, the process flow 400 may include the step of generating a computer-generated vocal indication based on the text data.

For example, the system may generate a computer-generated vocal indication based on the text data (e.g., audio data), which may be "spoken" by the virtual avatar in the virtual computing environment, such that it appears the virtual avatar is saying the strings of characters and/or words from the text data. In some embodiments, a pause may occur for the computer-generated vocal indication of the virtual avatar interface component, whereby a user of the user device may respond (e.g., by speaking, selecting an interface component, inputting/typing a response, perform an activity, and/or the like).

In some embodiments, and as shown in block 404, the process flow 400 may include the step of applying the computer-generated vocal indication to the virtual avatar interface component. For example, the system may apply the computer-generated vocal indication to the virtual avatar interface component, such that the virtual avatar of the virtual avatar interface component appears to be talking (e.g., moving the virtual avatar's mouth in sync and in a similar manner to a real being imitated by the virtual avatar) and saying the characters and/or words of the text data. In some embodiments, the virtual avatar interface component may comprise closed captioning on the user device, such that the user can view the text data as text output on the user device's graphical user interface. In some embodiments, the virtual avatar of the virtual avatar interface component may be configured to use sign language (e.g., via the avatar's computer-generated limbs), to indicate the text data/vocal indications to the user.

FIG. 5 illustrates a process flow 500 for transmitting the user communication data and the communication channel to a secondary internal communication component(s), in accordance with an embodiment of the disclosure. In some embodiments, a system (e.g., similar to one or more of the systems described herein with respect to FIGS. 1A-1C) may perform one or more of the steps of process flow 500. For example, a system (e.g., the system 130 described herein with respect to FIG. 1A-1C) may perform the steps of process 500.

In some embodiments, and as shown in block 502, the process flow 500 may include the step of identifying at least one transfer request associated with an internal communication channel. For example, the system may identify at least one transfer request within the internal communication channel, whereby the at least one transfer request may comprise data regarding the current user communication over the communication channel, an agent identifier at the entity that the user should be transferred to (e.g., via the communication channel). In some embodiments, the agent identifier may be associated with a user device identifier for the agent's user device that is connected to the entity's network, such that the transfer can occur automatically and efficiently.

In some embodiments, such a transfer request may be generated based on a current issue or problem the user of the user device is facing and a determination that another agent, another application, and/or the like, should be respond to the issue or problem instead of the current agent or application. In some embodiments, such a determination of the secondary or other agent may occur based on tagging a particular issue or problem faced by the user with an attribute, identifier, and/or the like, which may then be matched with a database of available agents and/or applications that comprise the same attribute, identifier, and/or the like (which may be stored or associated within the database).

In some embodiments, and as shown in block 504, the process flow 500 may include the step of identifying at least one secondary internal communication component based on the at least one transfer request. For instance, the system may identify secondary internal communication component (e.g., the agent's user device) which the user communication should be transferred automatically and efficiently.

In some embodiments, and as shown in block 506, the process flow 500 may include the step of transmitting the at least one user communication data and the communication channel to the at least one secondary internal communication component. For example, the system may automatically, upon identifying the secondary internal communication component, transfer the user communication to the secondary internal communication component. Additionally, and in some embodiments, upon transferring the user communication to the at least one secondary internal communication component, the virtual avatar interface component which the user sees in the user device will not change, but instead will be based on the internal communication data from the at least one secondary internal communication data. In this manner, the transfer will appear seamless to the user as nothing will change on the graphical user interface of the user device (e.g., the virtual avatar will be the same, but will now receive text data and/or audio data based on the secondary internal communication component).

FIG. 6 illustrates a process flow 600 for generating a threat score associated with a user of the communication channel, in accordance with an embodiment of the disclosure. In some embodiments, a system (e.g., similar to one or more of the systems described herein with respect to FIGS. 1A-IC) may perform one or more of the steps of process flow 600. For example, a system (e.g., the system 130 described herein with respect to FIG. 1A-1C) may perform the steps of process 600.

In some embodiments, and as shown in block 602, the process flow 600 may include the step of comparing historical user account data to current user account data from the communication channel. For example, and in some embodiments, the system may determine whether a user of the user device using the communication channel is attempting to a misappropriation event (e.g., misappropriate data, misappropriate applications, misappropriate accounts, misappropriate resources, and/or the like) when the user is interacting over the communication channel/internal communication channel. For instance, and in some embodiments, a user could be misrepresenting themselves as another user (e.g., such as within a virtual communication like a virtual job interview), and a determination of whether the user is the verified user of the account (e.g., the verified user for the virtual job interview).

Thus, and in some embodiments, to determine whether a misappropriation event is occurring or attempting to occur, the system may compare the historical user account data to current user account data (e.g., the user account data collected from the current communication channel), and determine whether the historical user account data and the current user account data match, are similar, or are dissimilar. In some embodiments, a direct matching of some of the historical user account data (e.g., geographic location of previous communications with the verified user, types of user devices used for previous communications with the verified user, the same background image of previous communications with the user, and/or the like) may be used to determine the user of the current communication is the verified user of previous communications. In some embodiments, the system may require only one piece of the historical user account data (historical user communication data, historical user account type data, historical image of a user, a historical sound of a user associated, a geographic location, a historical internet protocol (IP) address, a historical communication channel device, historical Wi-Fi identifiers/addresses, historical background data, and/or the like) may be required to match the same type of current user account data in order to determine the user of the current communication is the verified user of the user account. In some embodiments, the historical background data may comprise facial data of the verified user for previous communications and the current user account data may comprise facial data of the user of the current communication. Additionally, and by way of example, the system may use facial recognition on both the historical facial data and on the current facial data, determine whether the user of the current communication matches the verified user of the previous communications. In some embodiments, the facial data (such as the historical facial data) and other such historical or identifying data may be received, identified, gathered, and/or the like, from an entity's internal network and its databases and/or from a federated database or network (e.g., from a plurality of entities).

In some embodiments, and as shown in block 604, the process flow 600 may include the step of generating—based on the comparison of the historical user account to the current user account data, a threat score associated with a user of the communication channel. For example, and in some embodiments, the system may generate-based on the comparison-a threat score associated with the user of the current communication channel, whereby the threat score may be increased (indicating a high threat that the user of the current communication is different from the verified user of the user account) or decreased (indicating a low threat that that the user of the current communication is different from the verified user of the user account).

In some embodiments, the comparison of the historical user account data to the current user account data may additionally and/or alternatively be used to determine whether a singular user is attempting to open different accounts with different names/personally identifiable information (e.g., using falsified information to commit multiple misappropriation events through multiple user accounts). In this manner, the system may compare the historical user account data for multiple user accounts against the current user account of the current communication channel and determine if similar data matches across multiple user accounts.

In some embodiments, a threat score may be generated based on other factors instead of comparing the historical user account data and the current user account data. For instance, and in such embodiments, the threat score may be generated based on determining whether the user of the current communication is attempting to open many resource accounts under the same user account (which may indicate a misappropriation event) which may lead to the determination that the user is not allowed under particular protocols or policies.

In some embodiments, a threat score may be generated based on data regarding the current communication channel itself, without the user account data. For instance, and where the communication channel has previously been linked to at least one misappropriation event, the system may automatically tag the communication channel as likely be associated with a misappropriation event. Further, and in some embodiments, each communication channel may have its own identifier attached within the system, which may be based on elements or factors such as Wi-Fi address identifiers, IP address identifiers, user device identifiers, and/or the like. Such identifiers may be used to accurately and efficiently determine communication channels as potential threats as compared to other communication channels that may have been used previously or new communication channels.

In some embodiments, the threat score may be compared to a threat threshold score, and a threat attribute is generated based on the comparison of the threat score to the threat threshold score. For instance, a threat threshold score may be pre-determined and/or pre-generated by the system itself (e.g., based on previous instances where a misappropriation event has been determined and the associated threat score generated for those instances), by a manager of the system (e.g., an owner/operator of the system), by a client of the system (e.g., by an entity using the system), and/or the like. Additionally, and in such embodiments, the threat score generated may be compared to the threat threshold score and if the threat score meets or exceeds the threat threshold score, then a determination that the user communication is a misappropriation event. However, and in an instance where the threat score is less than the threat threshold score, then the system may determine that the user communication is not a misappropriation event.

In some embodiments, and once the determination that a misappropriation event has occurred, the system may additionally generate an alert interface component and transmit the alert interface component across the internal communication channel to the internal communication component currently at use. Such an alert interface component may comprise the data used to determine the likelihood of the misappropriation event, and at least one suggested transfer request for the user communication to be transferred to a different internal communication component for processing (e.g., a security personnel's communication component). Additionally, and as understood herein, the interface components herein described herein, comprise a data packet and configurations for configuring the recipient user device (e.g., the recipient communication component) and its graphical user interface, automatically.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for preventing synthetic misappropriation events over an electronic network, the system comprising:
   a memory device with computer-readable program code stored thereon;
   at least one processing device, wherein executing the computer-readable code is configured to cause the at least one processing device to perform the following operations:

identify a user communication associated with a communication channel;
identify a user account associated with the user communication;
collect user account data associated with the user account;
receive at least one user communication data via the communication channel;
transmit the at least one user communication data to at least one internal communication component;
receive at least one internal communication data from the internal communication component;
generate a virtual avatar based on at least one of user account data, the at least one user communication data, or the at least one internal communication data; and
transmit a virtual avatar interface component based on the virtual avatar to a user device associated with the communication channel, wherein the virtual avatar comprises the at least one internal communication data.

2. The system of claim 1, wherein the user account data comprises at least one of historical user communication data, historical user account data, current user communication data, current user account data, historical user account type data, or current user account type data.

3. The system of claim 2, wherein the historical user account data and the current user account data comprise at least one same data type.

4. The system of claim 1, wherein the communication channel comprises at least one of an audio communication channel, an audio-visual communication channel, or a messaging communication channel.

5. The system of claim 1, wherein the at least one internal communication data comprises text data, and wherein executing the computer-readable code is configured to cause the at least one processing device to perform the following operations:
generate a computer-generated vocal indication based on the text data; and
apply the computer-generated vocal indication to the virtual avatar interface component.

6. The system of claim 1, wherein executing the computer-readable code is configured to cause the at least one processing device to perform the following operations:
identify at least one transfer request associated with an internal communication channel;
identify at least one secondary internal communication component based on the at least one transfer request; and
transmit the at least one user communication data and the communication channel to the at least one secondary internal communication component.

7. The system of claim 6, wherein the secondary internal communication component is identified based the user communication data.

8. The system of claim 1, wherein executing the computer-readable code is configured to cause the at least one processing device to perform the following operations:
compare historical user account data to current user account data from the communication channel; and
generate, based on the comparison of the historical user account to the current user account data, a threat score associated with a user of the communication channel.

9. The system of claim 8, wherein the historical user account data comprises at least one of a historical image of a user, a historical sound of a user associated, a geographic location, a historical internet protocol address, a historical communication channel device, or a historical background data.

10. The system of claim 8, wherein the threat score is compared to a threat threshold score, and wherein a threat attribute is generated based on the comparison of the threat score to the threat threshold score.

11. A computer program product for preventing synthetic misappropriation events over an electronic network, wherein the computer program product comprises at least one non-transitory computer-readable medium having computer-readable program code portions embodied therein, the computer-readable program code portions which when executed by a processing device are configured to cause the processor to perform the following operations:
identify a user communication associated with a communication channel;
identify a user account associated with the user communication;
collect user account data associated with the user account;
receive at least one user communication data via the communication channel;
transmit the at least one user communication data to at least one internal communication component;
receive at least one internal communication data from the internal communication component;
generate a virtual avatar based on at least one of user account data, the at least one user communication data, or the at least one internal communication data; and
transmit a virtual avatar interface component based on the virtual avatar to a user device associated with the communication channel, wherein the virtual avatar comprises the at least one internal communication data.

12. The computer program product of claim 11, wherein the computer-readable program code portions which when executed by a processing device are configured to cause the processor to perform the following operations:
generate a computer-generated vocal indication based on the text data; and
apply the computer-generated vocal indication to the virtual avatar interface component.

13. The computer program product of claim 11, wherein the computer-readable program code portions which when executed by a processing device are configured to cause the processor to perform the following operations:
identify at least one transfer request associated with an internal communication channel;
identify at least one secondary internal communication component based on the at least one transfer request; and
transmit the at least one user communication data and the communication channel to the at least one secondary internal communication component.

14. The computer program product of claim 13, wherein the secondary internal communication component is identified based the user communication data.

15. The computer program product of claim 11, wherein the computer-readable program code portions which when executed by a processing device are configured to cause the processor to perform the following operations:
compare historical user account data to current user account data from the communication channel; and
generate, based on the comparison of the historical user account to the current user account data, a threat score associated with a user of the communication channel.

16. A computer implemented method for preventing synthetic misappropriation events over an electronic network, the computer implemented method comprising:
identifying a user communication associated with a communication channel;

identifying a user account associated with the user communication;
collecting user account data associated with the user account;
receiving at least one user communication data via the communication channel;
transmitting the at least one user communication data to at least one internal communication component;
receiving at least one internal communication data from the internal communication component;
generating a virtual avatar based on at least one of user account data, the at least one user communication data, or the at least one internal communication data; and
transmitting a virtual avatar interface component based on the virtual avatar to a user device associated with the communication channel, wherein the virtual avatar comprises the at least one internal communication data.

17. The computer implemented method of claim 16, wherein the computer implemented method further comprises:
generate a computer-generated vocal indication based on the text data; and
apply the computer-generated vocal indication to the virtual avatar interface component.

18. The computer implemented method of claim 16, wherein the computer implemented method further comprises:
identify at least one transfer request associated with an internal communication channel;
identify at least one secondary internal communication component based on the at least one transfer request; and
transmit the at least one user communication data and the communication channel to the at least one secondary internal communication component.

19. The computer implemented method of claim 18, wherein the secondary internal communication component is identified based the user communication data.

20. The computer implemented method of claim 16, wherein the computer implemented method further comprises:
compare historical user account data to current user account data from the communication channel; and
generate, based on the comparison of the historical user account to the current user account data, a threat score associated with a user of the communication channel.

* * * * *